(12) United States Patent
Paulson et al.

(10) Patent No.: US 11,241,929 B2
(45) Date of Patent: Feb. 8, 2022

(54) SEMI-ACTIVE CAB SUSPENSION ASSEMBLY METHOD

(71) Applicant: CNH Industrial America LLC, New Holland, PA (US)

(72) Inventors: Thomas J. Paulson, West Fargo, ND (US); Lucas Koch, St. Louis Park, MN (US); Mark S. Draeger, Oak Creek, WI (US); Rajeshwar Adupala, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 32 days.

(21) Appl. No.: 16/678,172

(22) Filed: Nov. 8, 2019

(65) Prior Publication Data

US 2020/0148023 A1    May 14, 2020

Related U.S. Application Data

(60) Provisional application No. 62/758,542, filed on Nov. 10, 2018.

(51) Int. Cl.
  *B60G 21/055* (2006.01)
  *B62D 33/06* (2006.01)

(52) U.S. Cl.
  CPC ......... *B60G 21/0551* (2013.01); *B62D 33/06* (2013.01); *B60G 2206/201* (2013.01); *B60G 2206/601* (2013.01); *B60G 2206/80* (2013.01)

(58) Field of Classification Search
  CPC .......... B60G 21/0551; B60G 2206/201; B60G 2206/80; B60G 2206/601; B60G 99/002; B60G 2204/162; B62D 33/06; B62D 24/04; B62D 33/0617; B62D 33/0604; B62D 33/0608; B62D 65/02; B62D 65/024
  USPC ............ 180/89.12, 89.13, 89.14; 296/190.07
  See application file for complete search history.

(56) References Cited

U.S. PATENT DOCUMENTS

| | | | | |
|---|---|---|---|---|
| 6,073,714 A | * | 6/2000 | McHorse | B60G 21/0551 180/89.13 |
| 8,371,562 B2 | * | 2/2013 | Knevels | B62D 33/067 267/64.27 |
| 9,283,993 B2 | * | 3/2016 | Rager | F16F 1/3873 |
| 10,494,039 B2 | * | 12/2019 | Young | B62D 33/0604 |
| 2018/0022401 A1 | * | 1/2018 | Tauber | B62D 33/0604 180/89.14 |
| 2020/0148285 A1 | * | 5/2020 | Charles | A01B 76/00 |

* cited by examiner

*Primary Examiner* — Paul N Dickson
*Assistant Examiner* — Caitlin Anne Miller
(74) *Attorney, Agent, or Firm* — Rickard K. DeMille; Rebecca L. Henkel

(57) ABSTRACT

A method for assembling an agricultural vehicle including the initial step of providing the agricultural vehicle including a frame, a hydraulic manifold, and a cab suspension system. The cab suspension system includes an anti-roll bar, a pair of support brackets configured for securing the anti-roll bar to the frame, and a pair of intermediary placement brackets configured for temporarily supporting the anti-roll bar in a final assembly position. The method includes the further steps of attaching the intermediary placement brackets onto the frame, positioning the anti-roll bar on the intermediary placement brackets to position the anti-roll bar in the final assembly position, assembling the hydraulic manifold onto the frame, and connecting the support brackets to the frame and the anti-roll bar.

17 Claims, 4 Drawing Sheets

SEMI-ACTIVE CAB SUSPENSION ASSEMBLY METHOD

CROSS REFERENCE TO RELATED APPLICATIONS

This is a non-provisional application based upon U.S. provisional patent application Ser. No. 62/758,542, entitled "SEMI-ACTIVE CAB SUSPENSION ASSEMBLY METHOD", filed Nov. 10, 2018, which is incorporated herein by reference.

BACKGROUND OF THE INVENTION

The present invention pertains to agricultural vehicles and, more specifically, to a method for assembling a cab suspension system of an agricultural vehicle.

Agricultural or industrial vehicles, such as tractors, combines, backhoes, cranes, or dozers, generally include a chassis, supported by wheels or tracks, a prime mover, and a cab. Large vehicles typically include a cab that is separately assembled as an individual unit and subsequently mounted onto the chassis via support mounts. As the vehicle traverses a field or roadway, vibrational and/or impact forces may be imparted from the chassis to the cab, which in turn reduces ride quality and operator comfort. Since a cab is generally a separate unit, the support mounts which connect the cab to the chassis may transmit and amplify the vibrational and/or impact forces experienced by the chassis onto the cab. Such forces may cause the cab to jounce, rotate from side to side and/or front to back, or vibrate. For example, impact forces resulting from the wheels traveling over undulations in the field may cause the cab to vertically jounce. These impact forces are only exacerbated by the augmented speeds of modern agricultural vehicles. Additionally, for example, draft forces from an implement acting on the hitch of a tractor or acceleration and deceleration forces, e.g. braking forces, may cause the cab to rotate from front to back about a lateral axis of the chassis. Hence, the forces transmitted to the cab during normal operation of the vehicle may lead to a diminished ride quality as well as operator discomfort and fatigue.

Large tractors generally include a cab suspension system for damping vibrations and impacts acting on the cab to enhance the ride quality and operator comfort. A typical cab suspension system includes support mounts, some of which may be rubber mounts, and compression springs. Further, a stabilizing linkage, such as Panhard bar, can be added to the support mounts of the cab to limit the vertical travel of the cab. In conjunction, the rubber mounts, compression springs, and Panhard bar may provide for passive damping of the forces imparted to the cab.

The cab suspension system and the assembly thereof may be limited by the narrow spacing between the cab and the chassis. For instance, numerous components may need to be fitted within this compact area, which then restricts the various kinds of support mounts, compression springs, or linkages that may be used to support the cab. Furthermore, certain parts of the cab suspension system may need to be intricately fitted relative to various other components of the vehicle. Hence, the assembly of the cab suspension system may be time-consuming and costly.

What is needed in the art is a cost-effective and efficient cab suspension system and a method of assembly thereof.

SUMMARY OF THE INVENTION

In one exemplary embodiment formed in accordance with the present invention, there is provided an agricultural vehicle with a chassis, a cab, and a cab suspension system. The cab suspension system includes an anti-roll bar, main support brackets, and intermediary placement brackets. During assembly of the agricultural vehicle, the anti-roll bar can be positioned on the intermediary placement brackets such that the anti-roll bar is first located in its final assembly position before installing the main support brackets and subsequently securing the anti-roll bar onto the main supports. Hence, the intermediary placement brackets allow the anti-roll bar to be positioned before installing the other components of the agricultural vehicle, thereby making the assembly of the cab suspension system less labor intensive and more efficient.

In another exemplary embodiment formed in accordance with the present invention, there is provided a method for assembling an agricultural vehicle. The method includes the initial step of providing the agricultural vehicle including a frame, a hydraulic manifold, and a cab suspension system. The cab suspension system includes an anti-roll bar, a pair of support brackets configured for securing the anti-roll bar to the frame, and a pair of intermediary placement brackets configured for temporarily supporting the anti-roll bar in a final assembly position. The method includes the further steps of attaching the pair of intermediary placement brackets onto the frame, positioning the anti-roll bar on the intermediary placement brackets to position the anti-roll bar in the final assembly position, assembling the hydraulic manifold onto the frame, and connecting the support brackets to the frame and the anti-roll bar.

In yet another exemplary embodiment formed in accordance with the present invention, there is provided a cab suspension system. The cab suspension system includes an anti-roll bar, a pair of support brackets configured for securing the anti-roll bar to the frame, and a pair of intermediary placement brackets configured for temporarily supporting the anti-roll bar in a final assembly position.

In yet another exemplary embodiment formed in accordance with the present invention, there is provided an agricultural vehicle. The agricultural vehicle includes a frame and a cab suspension system. The cab suspension system includes an anti-roll bar, a pair of support brackets configured for securing the anti-roll bar to the frame, and a pair of intermediary placement brackets configured for temporarily supporting the anti-roll bar in a final assembly position.

One possible advantage of the exemplary embodiment of the cab suspension system is that an anti-roll bar may be positioned in its final assembly position first before installing the other components of the vehicle, which in turn reduces labor, assembly time, and the overall production cost of the vehicle.

Another possible advantage of the exemplary embodiment of the cab suspension system is that suspension performance may be augmented because the intermediary placement brackets and main support brackets help to maximize the rigidity of the anti-roll bar system.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the agricultural vehicle, but again, they should not be construed as limiting. The terms "longitudinal" and "transverse" are determined with reference to the fore-and-aft direction of the agricultural vehicle and are equally not to be construed as limiting.

Figure 1:
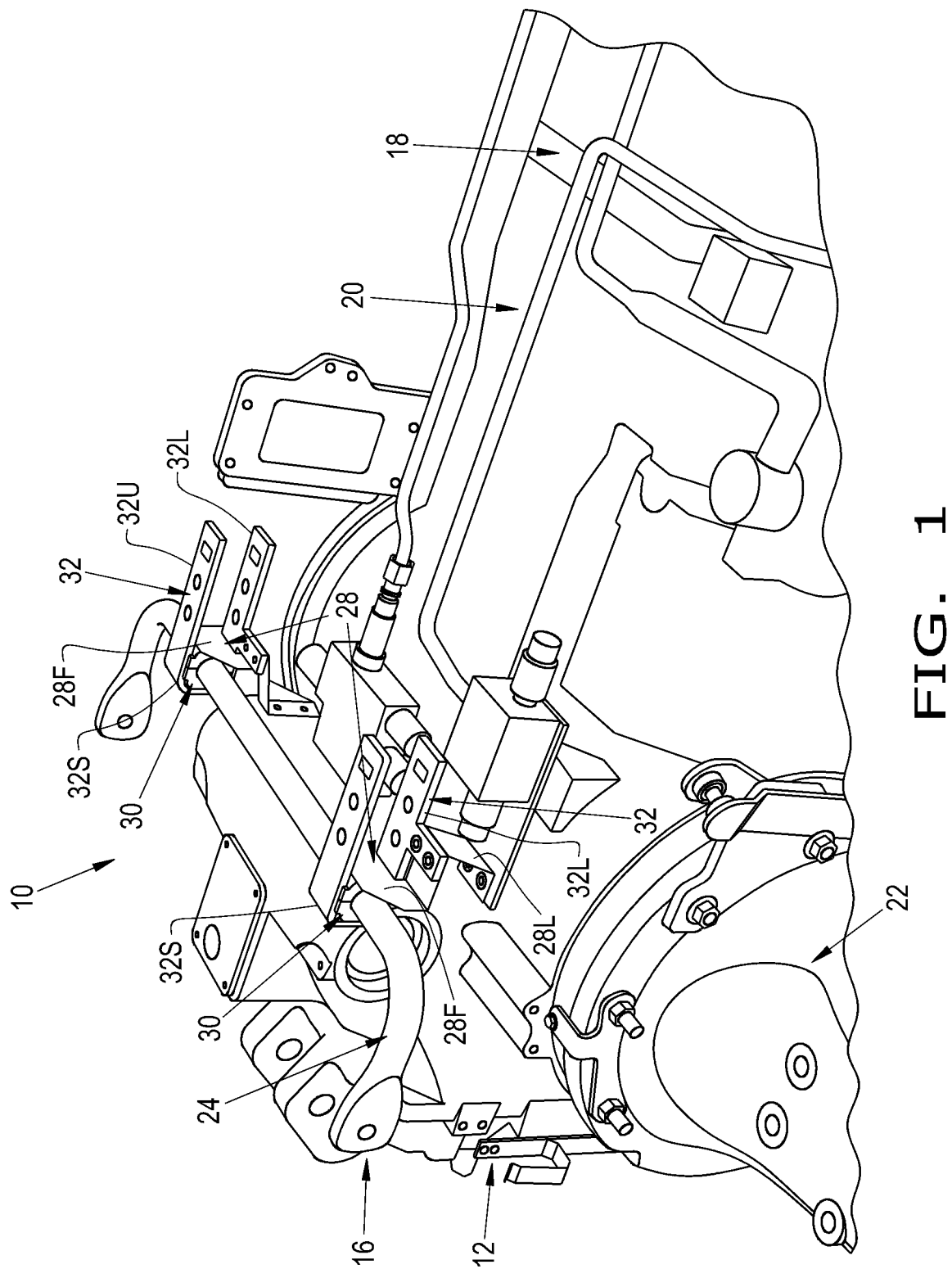
FIG. 1 illustrates a perspective view of an exemplary embodiment of an agricultural vehicle including a chassis and a cab suspension system, in accordance with an exemplary embodiment of the present invention.
Figure 2:
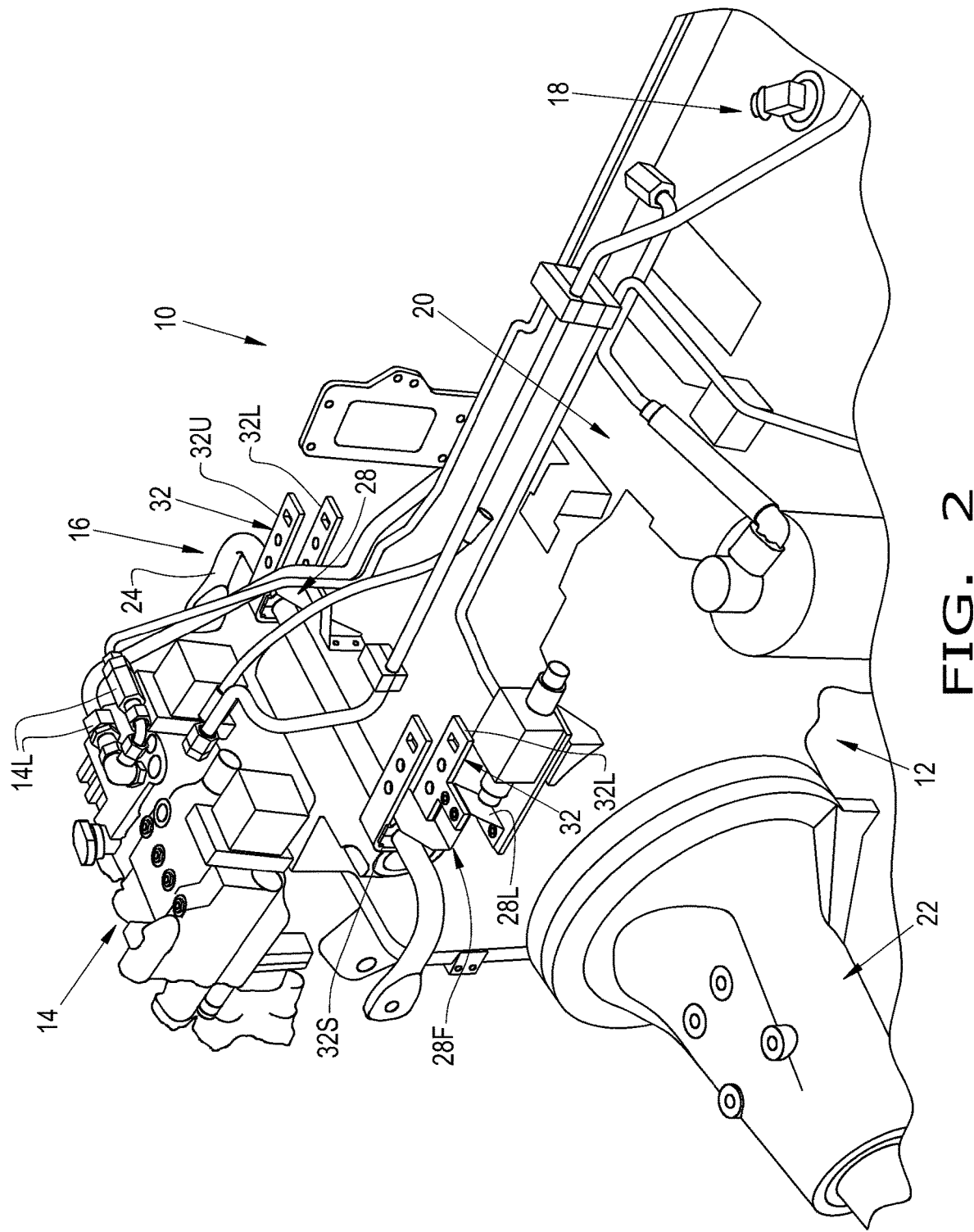
FIG. 2 illustrates a perspective view of the agricultural vehicle of FIG. 1, in accordance with an exemplary embodiment of the present invention.
Figure 3:
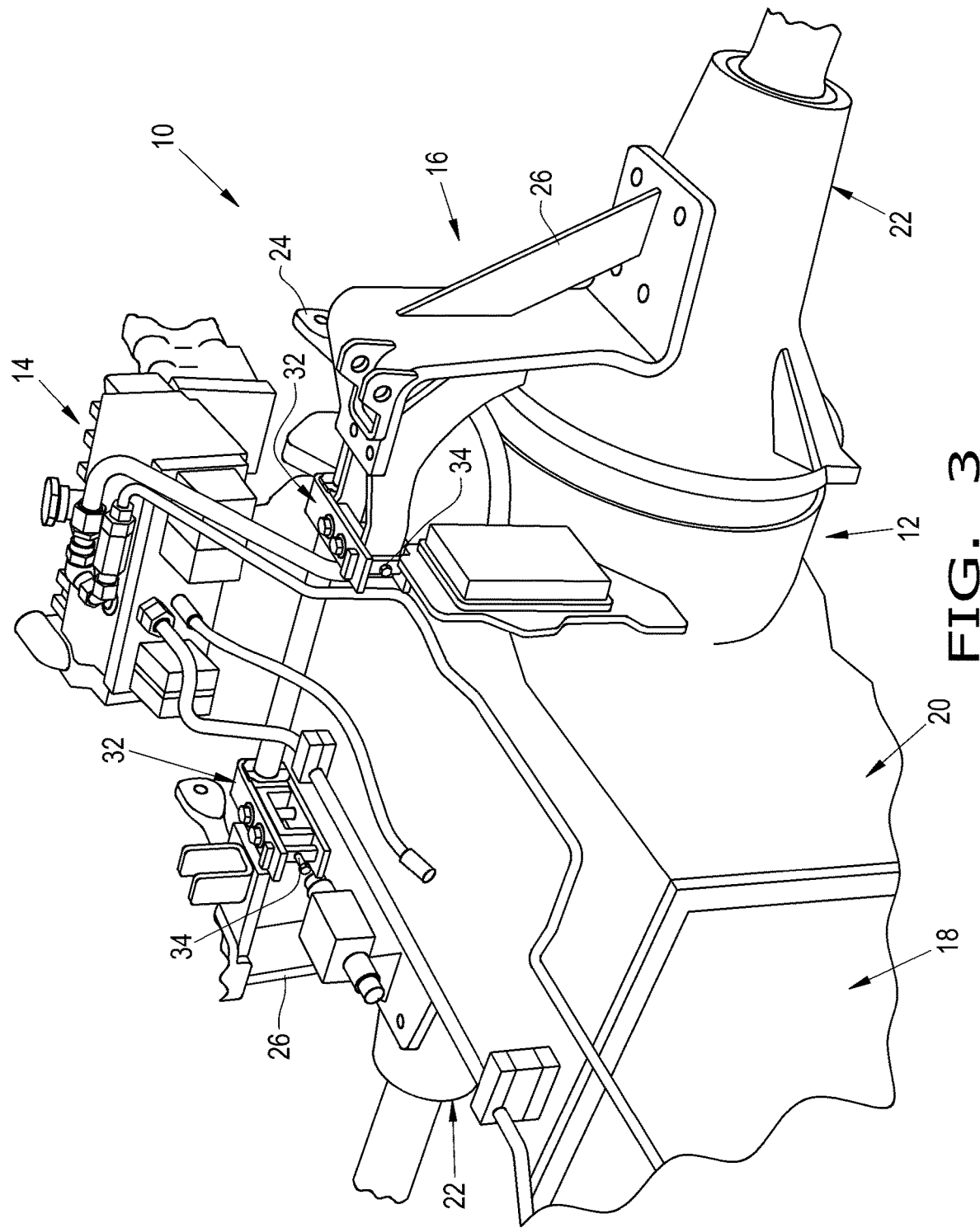
FIG. 3 illustrates a perspective view of the agricultural vehicle of FIGS. 1-2, in accordance with an exemplary embodiment of the present invention.

Referring now to the drawings, and more particularly to FIGS. 1-3, there is shown an exemplary embodiment of an agricultural vehicle 10. As shown, the agricultural vehicle 10 is in the form of a tractor, such as a Case IH Magnum™ series Cash-Crop-High (CCH) tractor. However, the agricultural vehicle 10 may be in the form of any desired industrial or agricultural vehicle, such as a combine, backhoe, crane, dozer, skidsteer loader, etc. The agricultural vehicle 10 generally includes a frame 12, e.g. a chassis 12, supported by wheels or tracks, a prime mover, a cab, a hydraulic manifold 14, and a cab suspension system 16 for supporting and connecting the cab to the frame 12.

The frame 12 may include a transmission housing 18, a differential housing 20, and a pair of axle housings 22 mounted on a respective side of the differential housing 20.

The hydraulic manifold 14 may be connected to and supported by the frame 12. The hydraulic manifold 14 may comprise fluid lines 14L and electrical lines which couple the hydraulic manifold 14 to the various hydraulic component(s), for example actuators, and system(s) of the agricultural vehicle 10 and/or cab suspension system 16 (FIGS. 2-3). The hydraulic manifold 14 may be in the form of any desired fluid manifold.

The suspension system 16 for the cab generally includes one or more suspension linkages 24, such as a Panhard bar and an anti-roll bar 24, a pair of main support brackets 26, and a pair of intermediary placement brackets 28. The suspension system 16 may also include a pair of front mounts, e.g. rubber mounts, a pair of rear mounts, and a pair of actuators, e.g. hydraulic cylinders in order to connect the cab to the frame 12. The Panhard bar can be connected in between the rear mounts. Additionally, the agricultural vehicle 10 may further include an electronic control unit (ECU), such as a controller with a memory, and at least one sensor for monitoring a position of the cab or actuators and sending a respective feedback signal to the ECU so that the ECU may automatically and selectively actuate the actuators to absorb and counteract a movement of the cab. It should be appreciated that that the ECU and sensor(s) may be incorporated as part of the suspension system 16.

The suspension linkage 24 may be connected to the cab and the frame 12. The suspension linkage 24 limits a rotation of the cab about the longitudinal axis of the frame 12. The suspension linkage 24 may be in the form of an anti-roll bar 24. The anti-roll bar 24 may be in the form of a "U"-shaped bar. However, the anti-roll bar 24 may have any desired shape. The ends of the anti-roll bar 24 can be respectively connected to the cab.

The anti-roll bar 24 may comprise a pair of bushings 30 and bushing retention brackets 32. The bushings 30 may surround the anti-roll bar 24 at two separate locations such that one bushing 30 is located on one side of the longitudinal axis of the frame 12 and the other bushing 30 is located on the other side of the longitudinal axis of the frame 12. The bushings 30 may be in the form of any desired bushings.

The bushing retention brackets 32 may at least partially surround and retain the bushings 30. The bushing retention brackets 32 serve to connect the anti-roll bar 24 to the main support brackets 26. Each bushing retention bracket 32 may have an elongated upper portion 32U, a side portion 32S, and an elongated lower portion 32L (FIG. 1). Thereby, each bushing retention bracket 32 has an open, elongated "U"-shape. Each upper portion 32U covers the top of each bushing 30 and extends outwardly therefrom. Each upper portion 32U may include one or more holes for receiving fasteners therethrough. The side portion 32S of each bushing retention bracket 32 covers the rear side of each bushing 30. Each lower portion 32L covers the bottom of each bushing 30 and extends outwardly therefrom. Each lower portion 32L may comprise a "T"-shape in which a member extends outwardly and perpendicularly from the main elongated portion of the lower portion 32L. Each lower portion 32L may include one or more holes for receiving fasteners therethrough. Each bushing retention bracket 32 may comprise any desired shape and be composed of any desired material, such as metal.

Furthermore, each bushing retention bracket 32 may include a retention plate 34 (FIG. 3). The retention plate 34 may be positioned between a respective pair of upper and lower portions 32U, 32L for closing the open "U"-shape of each bushing retention bracket 32. For example, each upper and lower portion 32U, 32L may include a plate receiving hole such that the retention plate 34 may slide through and be positioned within each plate receiving hole. Each retention plate 34 may include a receiving hole (not shown). Each retention plate 34 may have a "T"-shaped cross section; however, each retention plate 34 may have any desired cross-section. The retention plate 34 may comprise any desired material, such as metal.

The main support brackets 26 are configured for securing the anti-roll bar 24 to the frame 12 (FIG. 3). Each main support bracket 26 is connected to a respective axle housing 22 at one end and is connected to a respective bushing retention bracket 32 at the other end. Each main support bracket 26 can be connected to a respective bushing retention bracket 32 by way of a two-stage tightening system. Sequentially, the retention plate 34 may be positioned in between the upper and lower portions 32U, 32L of a respective bushing retention bracket 32, at least one screw may be located in the receiving hole of the retention plate 34 and may be tightened to press the main support bracket 26 toward a respective intermediary placement bracket 28 and/or bushing 30. Then, at least one upper retaining bolt, such as a pair of bolts, may be inserted through a respective upper portion 32U and then through a lower portion 32L of a bushing retention bracket 32, and may be tightened to secure, e.g. clamp, the upper and lower portions 32U, 32L around a respective bushing 30. The main support brackets 26 can be highly rigid support brackets. The main support brackets 26 may comprise any desired shape and material.

The intermediary placement brackets 28 may be configured for temporarily supporting the anti-roll bar 24 in a final assembly position. As used herein, the final assembly position refers to the position of the anti-roll bar 24 during operation of the agricultural vehicle 10. The intermediary placement brackets 28 may merely position and temporarily hold the anti-roll bar 24 in its final assembly position. In this regard, the intermediary placement brackets 28 may initially and properly position the anti-roll bar 24 so that the other components of the agricultural vehicle 10 may be assembled around and adjacent to the anti-roll bar 24.

The intermediary placement brackets 28 can be connected to the frame 12 at any desired location. For instance, one intermediary placement bracket 28 may connected to a wiring harness, which in turn is connected to the frame 12, and the other intermediary placement bracket 28 may be connected to a valve support mount, which in turn is connected to the frame 12. Each intermediary placement bracket 28 may include a lower portion 28L connected to the frame 12 and an upper portion in the form of a flange 28F which contacts a respective bushing retention bracket 30 (FIG. 1). A respective upper portion 32U may rest on top of a respective flange 28F of an intermediary placement bracket 28 and/or a respective lower portion 32L may be supported by and/or fastened to a respective lower portion 28L of an intermediary placement bracket 28. The intermediary placement brackets 28 may be identical to one another or each intermediary placement bracket 28 may comprise its own unique shape.

Figure 4:
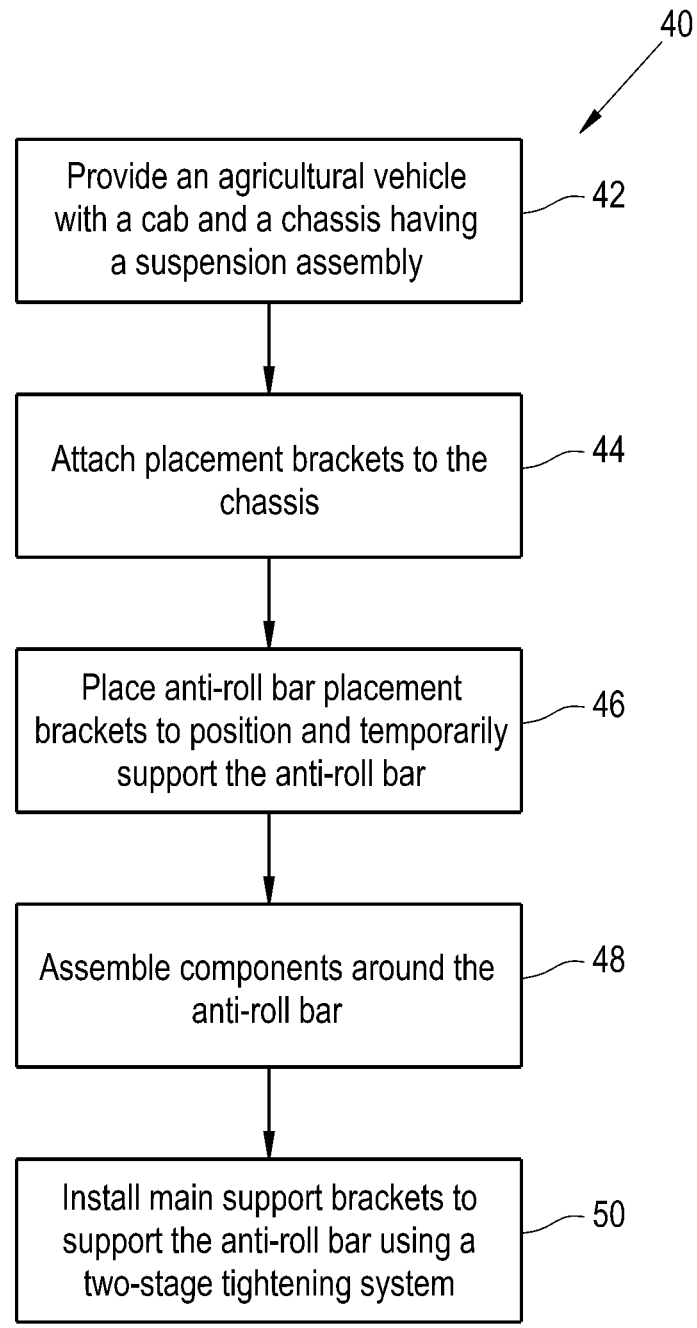
FIG. 4 illustrates a flow diagram of a method for assembling the agricultural vehicle, in accordance with an exemplary embodiment of the present invention.

Referring now to FIG. 4, there is shown a flow diagram of a method 40 for assembling the agricultural vehicle 10. Initially, an agricultural vehicle 10 may be provided (at block 42). The agricultural vehicle 10 may include a frame 12, a hydraulic manifold 14, and a cab suspension system 16, as discussed above. Next, the lower portions 28L of the intermediary placement brackets 28 may be attached to the frame 12 (at block 44; FIG. 1). Then, the anti-roll bar 24 may be positioned on the intermediary placement brackets 28 to position the anti-roll bar 24 in the final assembly position (at block 46). In more detail, the bushings 30 and the bushing retention brackets 32 may be positioned adjacent to the flanges 28F such that the flanges 28F at least partially support the anti-roll bar 24. Thereby, the anti-roll bar 24 is easily and efficiently located, and the intermediary placement brackets 28 may temporarily support the anti-roll bar 24 until the main support brackets 26 are assembled. Once the anti-roll bar 24 is placed in the final assembly position, the hydraulic manifold 14 may be connected to the frame 12 (at block 48; FIG. 2). In other words, the hydraulic manifold 14 is assembled only after the anti-roll bar 24 is placed in the final assembly position. This step may include assembling the hydraulic manifold 14 and the various fluid lines 14L and electrical lines as well as assembling any other components onto the frame 12. Then, the support brackets 26 may be connected to the frame 12 and to the anti-roll bar 24 (at block 50; FIG. 3). Each main support bracket 26 can be connected to the anti-roll bar 24, the bushing support brackets 32, and the intermediary placement brackets 28 using the two-stage tightening system. First, after the retention plate 34 is inserted into the upper and lower portions 32U, 32L of a respective bushing retention bracket 32, an operator may tighten at least one screw to press the main support bracket 26 toward the respective intermediary placement bracket 28 and bushing 30. Then, an operator may tighten the upper retaining bolts to clamp the upper and lower portions 32U, 32L around a respective bushing 30 and to the respective support bracket 26. Thereby, the intermediary placement brackets 28 in conjunction with the bushing retention brackets 32 and main support brackets 26 help to secure the bushings 30, and provide a consistent clamping of the bushings 30, such that the overall rigidity of the anti-roll bar 24 is augmented. In turn, this increased and consistent rigidity helps to improve the ability of the anti-roll bar 24 to counteract a movement of the cab; thus, improving the suspension of the cab suspension system 16.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method for assembling an agricultural vehicle, comprising:
    providing a frame for the agricultural vehicle, a hydraulic manifold for the agricultural vehicle, and a cab suspension system, the cab suspension system comprising an anti-roll bar, a pair of support brackets configured for securing the anti-roll bar to the frame, and a pair of intermediary placement brackets configured for temporarily supporting the anti-roll bar in a final assembly position;
    attaching the intermediary placement brackets onto the frame;
    positioning the anti-roll bar on the intermediary placement brackets such that the anti-roll bar is in the final assembly position;
    assembling the hydraulic manifold onto the frame; and
    connecting the support brackets to the frame and the anti-roll bar.

2. The method of claim 1, wherein each intermediary placement bracket comprises a lower portion and an upper portion in the form of a flange, and the step of attaching the intermediary placement brackets comprises attaching the lower portion of each intermediary placement bracket onto the frame.

3. The method of claim 2, wherein each anti-roll bar comprises a pair of bushings and a pair of bushing retention brackets, and the step of positioning the anti-roll bar on the intermediary placement brackets comprises positioning the bushings and the bushing retention brackets adjacent to the flanges such that the flanges at least partially support the anti-roll bar.

4. The method of claim 3, wherein the step of connecting the support brackets to the frame and the anti-roll bar comprises a step of fastening a respective support bracket to a respective bushing retention bracket using a two-stage tightening system by tightening at least one tensioning screw to press the respective support bracket toward a respective bushing and tightening at least one retaining bolt to secure the respective bushing retention bracket around the respective bushing and to the respective support bracket.

5. The method of claim 3, wherein each bushing retention bracket comprises an elongated upper portion, a side portion, and an elongated lower portion such that each bushing retention bracket has an open "U"-shape.

6. The method of claim 5, wherein each bushing retention bracket further comprises a retention plate positionable between a respective pair of elongated upper and lower portions for closing the open "U"-shape.

7. The method of claim 1, wherein the step of assembling the hydraulic manifold onto the frame occurs only after the anti-roll bar is placed in the final assembly position.

8. The method of claim 1, wherein the intermediary placement brackets are configured for temporarily supporting the anti-roll bar until the support brackets are connected to the frame and the anti-roll bar.

9. A cab suspension system for an agricultural vehicle having a frame, comprising:
   an anti-roll bar;
   a pair of support brackets configured for securing the anti-roll bar to the frame; and
   a pair of intermediary placement brackets configured for temporarily supporting the anti-roll bar in a final assembly position,
   wherein a respective support bracket is fastened to a respective bushing retention bracket by way of a two-stage tightening system by tightening at least one tensioning screw to press the respective support bracket toward a respective bushing and tightening at least one retaining bolt to secure the respective bushing retention bracket around the respective bushing and to the respective support bracket.

10. The cab suspension system of claim 9, wherein the anti-roll bar comprises a pair of bushings and a pair of bushing retention brackets.

11. The cab suspension system of claim 10, wherein each bushing retention bracket comprises an elongated upper portion, a side portion, and an elongated lower portion such that each bushing retention bracket has an open "U"-shape.

12. The cab suspension system of claim 11, wherein each intermediary placement bracket comprises a lower portion and an upper portion which at least partially supports a respective elongated upper portion of a respective bushing retention bracket.

13. The cab suspension system of claim 11, wherein each bushing retention bracket further comprises a retention plate positionable between a respective pair of elongated upper and lower portions for closing the open "U"-shape.

14. An agricultural vehicle, comprising:
    a frame; and
    a cab suspension system, comprising:
       an anti-roll bar comprising a pair of bushings and a pair of bushing retention brackets;
       a pair of support brackets configured for securing the anti-roll bar to the frame; and
       a pair of intermediary placement brackets configured for temporarily supporting the anti-roll bar in a final assembly position,
    wherein a respective support bracket is fastened to a respective bushing retention bracket by way of a two-stage tightening system by tightening at least one tensioning screw to press the respective support bracket toward a respective bushing and tightening at least one retaining bolt to secure the respective bushing retention bracket around the respective bushing and to the respective support bracket.

15. The agricultural vehicle of claim 14, wherein each bushing retention bracket comprises an elongated upper portion, a side portion, and an elongated lower portion such that each bushing retention bracket has an open "U"-shape.

16. The agricultural vehicle of claim 15, wherein each intermediary placement bracket comprises a lower portion and an upper portion which at least partially supports a respective elongated upper portion of a respective bushing retention bracket.

17. The agricultural vehicle of claim 15, wherein each bushing retention bracket further comprises a retention plate positionable between a respective pair of elongated upper and lower portions for closing the open "U"-shape.

* * * * *